Jan. 1, 1935.  W. C. ELLIS  1,985,890
TIME CONTROLLED RELEASING MECHANISM
Filed Aug. 31, 1933  4 Sheets-Sheet 1
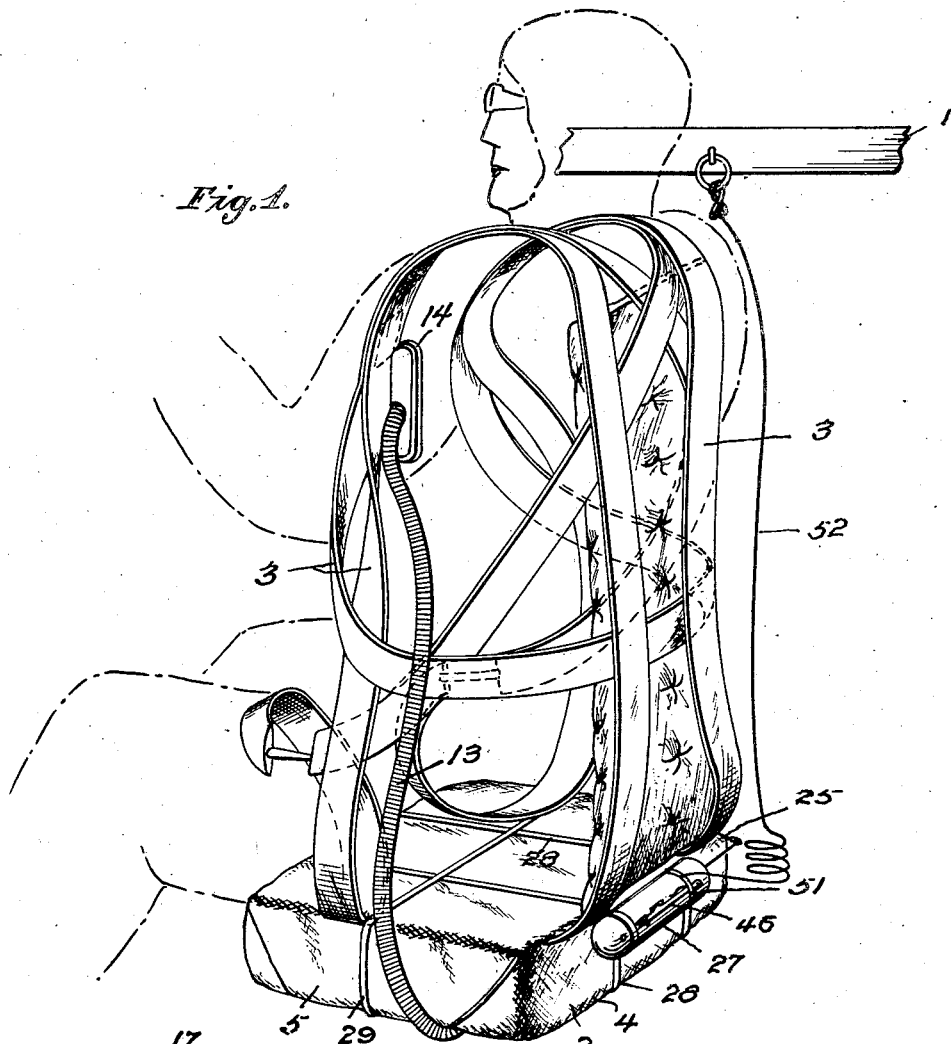
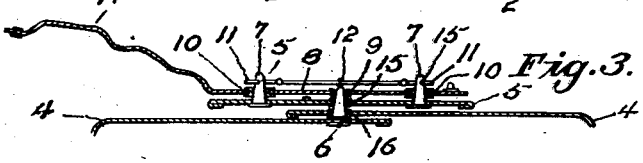
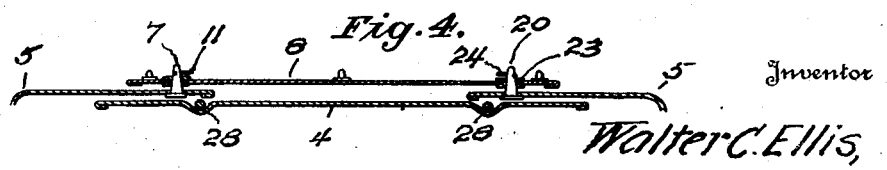
Inventor
Walter C. Ellis,
By
Attorney Jan. 1, 1935.  W. C. ELLIS  1,985,890
TIME CONTROLLED RELEASING MECHANISM
Filed Aug. 31, 1933   4 Sheets-Sheet 2
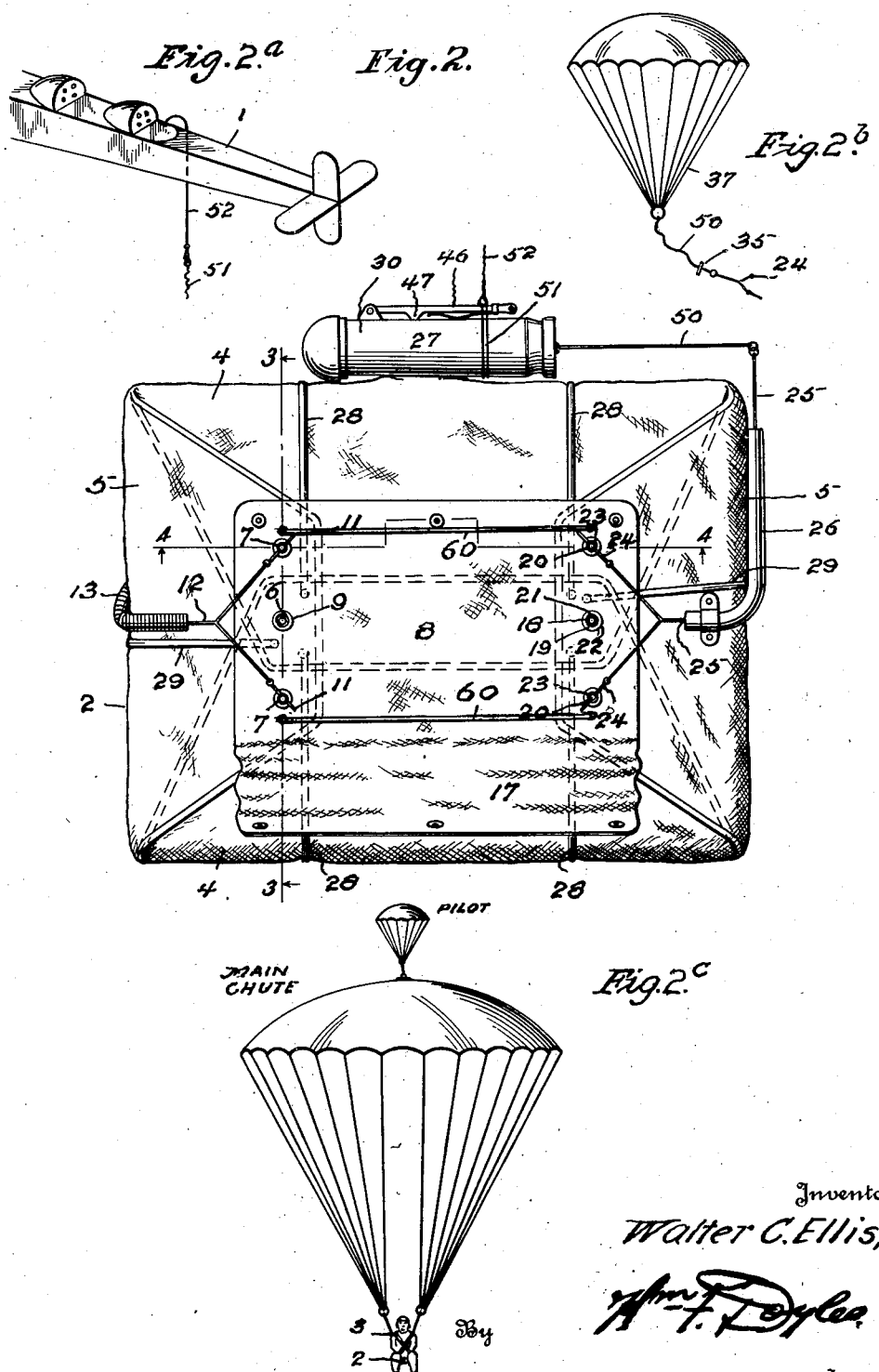

Jan. 1, 1935.  W. C. ELLIS  1,985,890
TIME CONTROLLED RELEASING MECHANISM
Filed Aug. 31, 1933  4 Sheets-Sheet 3
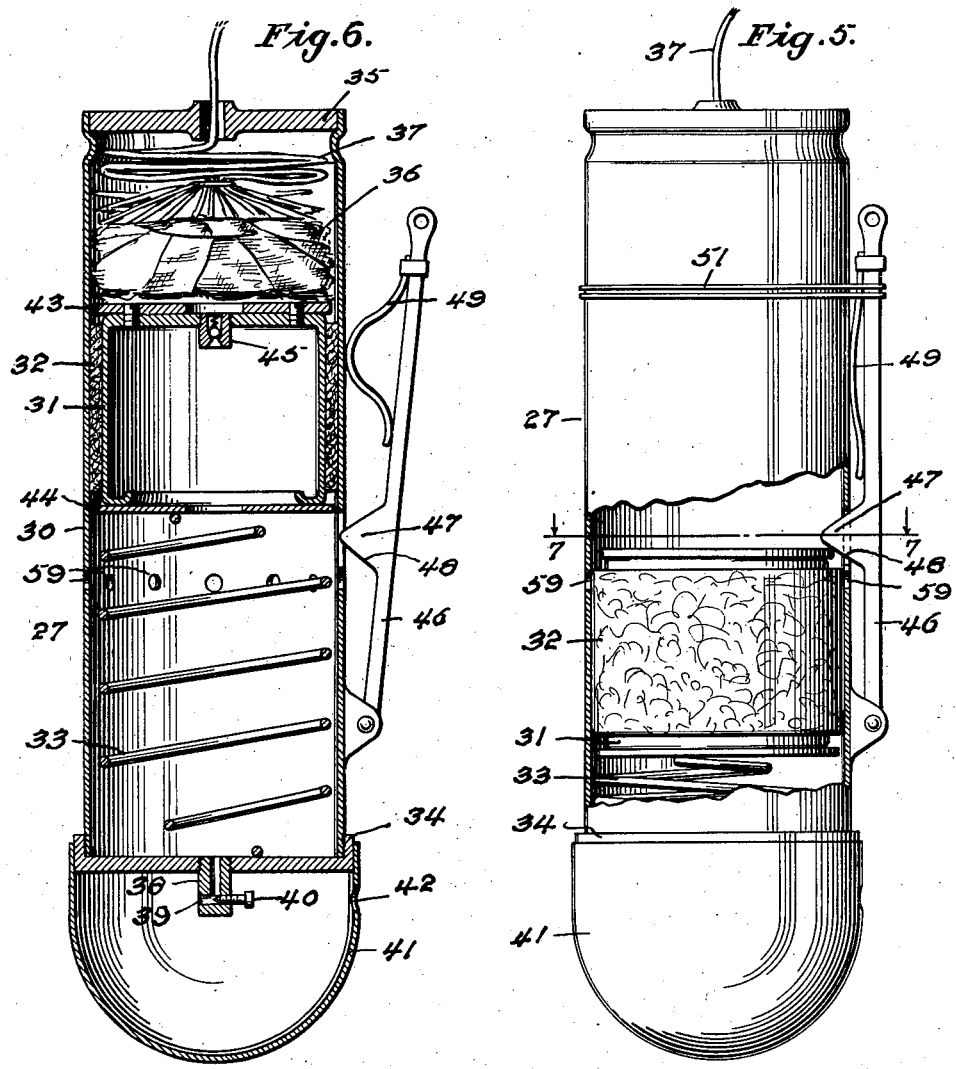
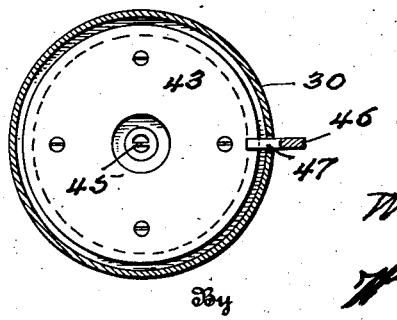

Jan. 1, 1935.  W. C. ELLIS  1,985,890
TIME CONTROLLED RELEASING MECHANISM
Filed Aug. 31, 1933  4 Sheets-Sheet 4
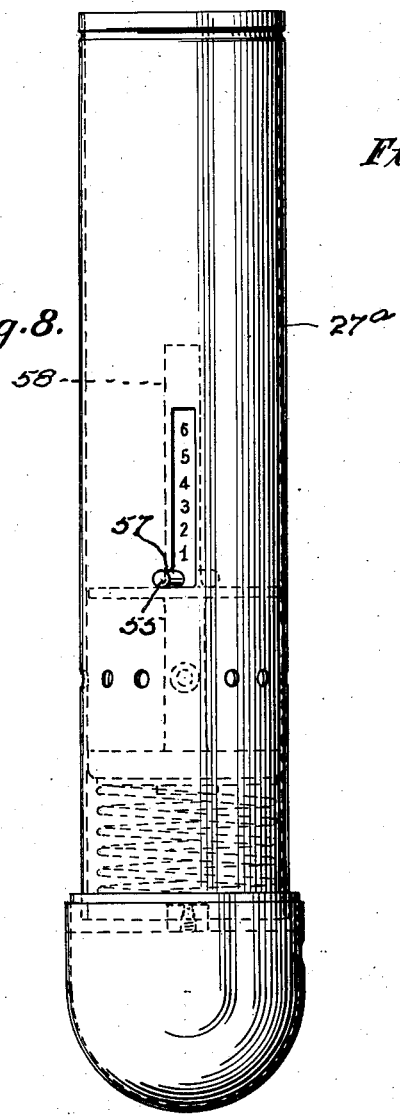
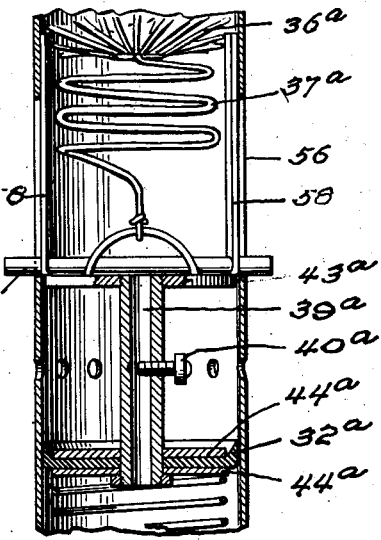
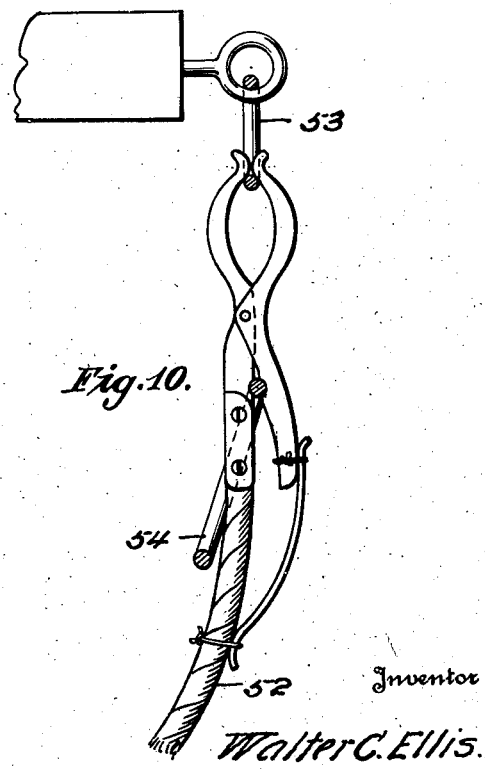
Inventor
Walter C. Ellis.
By
Attorney Patented Jan. 1, 1935

1,985,890

UNITED STATES PATENT OFFICE 1,985,890

TIME CONTROLLED RELEASING MECHANISM

Walter C. Ellis, United States Army

Application August 31, 1933, Serial No. 687,641

8 Claims. (Cl. 244—21)

(Granted under the act of March 3, 1883, as amended April 30, 1928; 370 O. G. 757)

The invention described herein, if patented, may be manufactured and used by or for the Government for governmental purposes without the payment of any royalty thereon.

This invention relates to improvements in time controlled releasing mechanisms, and more particularly to an adjustable time controlled releasing mechanism adapted to operate a rip cord of the standard service or free type of parachute, to open the pack carrier, release the pilot chute and discharge the main chute.

The objects of this invention are to provide a durable and inexpensive structure of a simple character, having few parts of sturdy construction that will require the minimum of repairs, and one wherein its operation may be quickly understood and set, for automatic or manual operation by simple and effective means.

A further object is to provide releasing means for automatic or manual operation, that may be added as auxiliary to the present standard parachute releasing means, without interfering therewith in any way or replace the present standard manually operated means.

Another object in view is to provide a releasing mechanism that will either operate automatically, should the aviator be thrown from the aircraft in an unconscious condition or injured in such a manner as to be unable to manually operate same, or that should the aviator desire to do so, he can, prior to leaving the aircraft, quickly and with a single, simple operation, convert said mechanism from an automatic into one for manual operation only.

A further object is to provide a time controlled mechanism that may be set to release a parachute at a predetermined time, or may be tripped manually to operate at a desired time, and thereby eliminate the present practice required of the aviator to count three after leaving the aircraft, which represents approximately three seconds in which he may fall free of same to avoid possible fouling of parts of the draft by any part of the parachute as it is discharged from the pack carrier.

A further object is to provide a mechanism of such a character as will permit, with slight variation in connecting elements, its application in a variety of ways to accomplish the releasing operation.

It will be understood that the parts as shown and described are for the purposes of illustrating a preferred arrangement, but that slight changes in form and minor details of construction may be resorted to without departing from the spirit of the invention or falling beyond the scope of the claims.

Similar numerals indicate corresponding parts in all the figures of the drawings in which:

Fig. 1 is a diagrammatic view of a standard army parachute shown in position on the aviator when in the aircraft, the aviator shown in dots, and the releasing device in position on the pack carrier.

Fig. 2 is an enlarged detail view of the pack carrier, with the flap of the retaining patch thrown back, the standard rip cord parts slightly rearranged and the auxiliary automatically or manually operated rip cord parts exposed to view.

Fig. 2a shows fragment of airship with automatic breaker cord and light lever retaining cord.

Fig. 2b shows the releasing parachute after its discharge from its container and its rip cord and prongs.

Fig. 2c shows the main and pilot chutes after release from the pack.

Fig. 3 is a detail section on line 3—3 of Fig. 2 through the flaps of the pack and retaining patch.

Fig. 4 is a detail section on line 4—4 of Fig. 2.

Fig. 5 is an enlarged detail partly in longitudinal section through the time controlled element of the auxiliary rip cord mechanism, with its contents in place and the latch lever held depressed by the light retaining cord.

Fig. 6 is a similar view with the latch released, the piston advanced and the contents just prior to being discharged.

Fig. 7 is a section taken on line 7—7 of Fig. 5.

Fig. 8 is a modified form of device wherein a cross arm operates through the sides of the cylinder for setting the device, and a scale provides means whereby the time of operation may be controlled.

Fig. 9 is a fragmentary section of Fig. 8 showing the modified form of piston therein.

Fig. 10 is an enlarged view of the quick release at upper end of breaker cord.

Reference now being had to the drawings by numerals, 1 indicates a fragment of an airship, 2 a standard Army pack carrier, 3 the usual harness adapted to secure the pack to the aviator and the aviator to the main parachute, when it is released from the pack.

The pack carrier 2 is of the usual form, having end and side flaps 4 and 5 respectively, adapted to lap over the folded main and pilot parachutes from four sides.

The flaps of the pack carrier are held, folded over the said parachutes by retaining patch 8, secured by prongs 11 at the end of rip cord 12 passing through perforations in cones 7 at one side of the pack. Said rip cord extending up through housing 13, and is provided at its upper end with the usual D ring 14 in a convenient position for operation, by the aviator, who by a pull on the cord withdraws prongs 11 from the perforation in cones 7 at one side of the pack, and thereby permits the pack to open and release the contents thereof.

By reference to Figs. 2 and 3 it will be seen that the center cone 6 is mounted in the inner end flap 4, and projects outwardly through grommet 16 in the other, over-lapping end flap 4, through grommet 15 in the side flap 5 and also through grommet 9 in patch 8.

Cones 7 are mounted in side flap 5 and extend outwardly through grommets 10 in patch 8 and are fastened by prongs 11, extending through perforations 15 in cones 7, above grommets 10.

With the parts as above described the inner end flap 4, in which the cone 6 is mounted is folded over the main and pilot chutes, the other end flap 4 is then folded over and its grommet 16 is threaded over cone 6. The side flap 5 is then folded over with its grommet 15 threaded over cone 6. The retaining patch is then placed in position with its grommets 9 and 10 threaded over cones 6 and 7, prongs 11 of the rip cord are then inserted through the perforation in said cones 7, thereby securing one side flap 5 and the adjacent portions of end flaps 4 in place, said securing means being of such a character as to permit quick and entire release of the parts, when prongs 11 are withdrawn. Retaining patch 8 is provided with an extension 17 provided with snap fasteners, adapted to be folded over said cones and retaining prongs to protect the parts against injury or accidental displacement.

The parts as above described are arranged at one side of the pack and are adapted to be operated in the usual way by the aviator pulling the rip cord, after he has left the aircraft and has fallen free therefrom.

The other side of the pack is of the same construction and the parts are folded and retained in the same manner. Said parts are the auxiliary means for launching the chute and are adapted to be operated by the time controlled releasing means, that may be tripped manually or automatically.

As stated, the parts of the pack and retaining means operated by the auxiliary release are similar to those above described and consist of the cone 18 mounted in the inner end flap 4 of the pack carrier, a grommet 19 in the other end flap is threaded over cone 18, the side flap 5 is provided with outwardly projecting cones 20 and a grommet 21 threaded over cone 18. The adjacent end of the retaining patch 8 is provided with grommets 22 and 23 threaded over cones 18 and 20 respectively.

Cones 20 as on the other side of the pack are provided above the outer grommets 23 with perforations through which prongs 24 at the end of auxiliary rip cord 25 pass to secure the parts, on the adjacent side of the pack in place.

The auxiliary rip cord 25 extends up through housing 26 mounted on the side flap 5 and is connected by link 50 to said manually or automatically tripped releasing device 27.

The usual pack opening elastic members 28 and 29 encircle the pack and are adapted to rapidly draw back the end and side flaps respectively of the pack, when released by either of the rip cords.

By reference to Figs. 5 to 8 inclusive, the details of the auxiliary chute releasing mechanism are shown wherein a cylinder 30 consisting preferably of a short length of smooth bore tubing in which a piston 31 having packing 32 is adapted to operate under the influence of spring 33. The packing 32 may be of leather or any other appropriate material preferably extending the entire length of the piston and is adapted to effect a perfect air seal, with little area pressure to provide an easy uniform movement of the piston.

One end of the cylinder is provided with a screw threaded closure 34, between which and the piston 31 coil compression spring 33, is arranged, said spring tending to force the air tight piston 31 toward the other end of the cylinder.

The opposite end of the cylinder is closed by friction disk 35, between which and the piston 31, is arranged a folded small parachute 36 adapted to be attached by flexible connection 37 to the auxiliary rip cord 25 of the pack.

Closure 34 is provided with an air inlet valve 38 provided with air inlet passage 39 and adjustable valve 40 adapted to control the passage of air into the air tight portion of the cylinder occupied by spring 33 in rear of piston 31, said air inlet valve is adjustable and is the time controlling element.

A cap 41 having an air inlet 42 is mounted on the end of the cylinder and covers and protects said valve from accidental adjustment, injury and dust.

Said cap 41 may be sufficiently enlarged, or be replaced by a cap of greater size for the purpose of receiving a message or other small article when the device in a slightly modified form is used to drop an article from an airship slowly, such as a message or a torch, in said latter use the device is removed from its mounting on the pack, disconnected from the auxiliary rip cord and dropped by the aviator after releasing the operating handle.

To diminish cost of production, a piston head plate 43 may be provided at one end of the piston and a follower 44, against which an end of spring 33 operates.

In setting the device, a valve 45 is provided in piston head plate, for the release of trapped air in the part of the cylinder 30 occupied by spring 33.

Mounted on cylinder 30 is an operating lever 46 provided with piston retaining lug 47, adapted to rest above and retain the piston in its depressed position with spring 33 compressed. Said lug is preferably tapered as at 48 to insure release of the piston and the operation of lever 46 in its movement. Leaf spring 49 is mounted on lever 46, bears against the side of the cylinder and tends to force the lever at its free end away from the cylinder to insure prompt withdrawal of lug 47 and release of piston 31. Lever 46 after piston 31 has been depressed, is adapted to be forced against the tension of leaf spring 49, over to a position practically parallel with and adjacent to the side wall of the cylinder and there secured by preferred means such as a relatively easily broken lever retaining cord 51 wrapped around the cylinder and lever. In said depressed position of the lever, lug 47 with its inclined face 48 projects into the cylinder and retains piston 31 in its depressed position.

Around the cylinder is a series of openings 59 arranged a short distance in rear of the piston when in its advanced position or at the end of its travel under the pressure of spring 33. Said openings are a direct communication between the outer air, and the interior of the cylinder when uncovered by the piston, the piston forming an air tight joint over said openings 59, during the greater part of the travel of the piston from its depressed to advanced position, the speed of said travel being controlled by the adjustment of valve 38.

The light, lever retaining cord 51, is connected by breaker cable 52 to a part of the aircraft within reach of the aviator, and in such a manner as will permit its quick release, as shown in Figs. 1 and 10, wherein a ring 53 is mounted on the side of the fuselage of the ship, the upper end of breaker cord being provided with a quick release anchorage such as shown in Fig. 10 wherein a pull on cord 52 will not release the anchorage, but a slight pull on jaw locking member 54 will quickly separate the parts.

With reference to Figs. 8 and 9, there is shown a structure having all the fundamental principles of the preferred form but slightly modified to provide for its use as a signal, or message dropping mechanism and consists of inserting the small parachute 36a into the cylinder with its flexible connection 37a beneath the parachute and secure said connection to the piston. By said change the parachute never becomes entirely separated from the cylinder, which is lowered with its message, a light or by a parachute of a color having code significance or may be projected by manual or mechanical means from the ground. When used as in the instances last cited the device will not be mounted on or in any way be connected with the main parachute pack, but will be dropped from the aircraft after setting the timing means as will appear later.

Fig. 8 and Fig. 9 show a modified form of piston, wherein the usual form of flexible cup shaped packing 32a is used, the piston having an upper disc 43a to which the flexible connection 37a may be attached, lower discs 44a between which packing 32a is secured, said upper and lower discs being connected by a tubular member providing an air passage 39a controlled by valve 40a for the purpose of timing the travel of the piston and discharge of the parachute.

If thought advisable a light coil spring (not shown) may be inserted between the parachute and the top of the piston to assist in the forcible discharge of the parachute.

A cross arm 55 mounted on upper piston disc 43a and extending through slots 56 in the sides of cylinder 27a is adapted when setting the device to be depressed and secured in a notch 57 at the lower end of slot 56. Traveler strips 58 provided with scales, cover slots 56 and provide means whereby the device can be released and caused to operate at a predetermined time.

The operation of this device when applied to the usual parachute pack having a rip cord as illustrated in Figs. 1, 2, 2a, 2b, and 2c, is as follows: The device is mounted on the pack and if it is desired to have the main parachute operate to lower the aviator, should he be thrown from the air craft in for instance, an unconscious condition, the relatively strong or breaker cable 52 is secured at its upper end to ring 53 secured to the aircraft, and at its lower end to the relatively light lever retaining cord 51.

Should the aviator be thrown from the craft, cable 52 will break cord 51, release the piston, which under the influence of the spring will start toward the end of the cylinder in which the small releasing parachute 36 is stored. The speed at which the piston travels during its initial movement is controlled by the set of valve 38. When the piston uncovers openings 59, the resistance to the movement of the piston is removed and it forcibly jumps toward the end of the cylinder and due to the resistance of friction disc 35 in the end of the cylinder, considerable pressure is developed in the parachute chamber, which when disc 35 gives way, bursts out of the end of the cylinder and the parachute is practically shot from the cylinder, and due to the manner of storing the parachute, it opens immediately on leaving the cylinder.

The flexible connection 37 is a continuation or extension of the usual rip cord 25 having prongs adapted to secure one side of the retaining patch in place on cones 18 and 20. When the small parachute functions the rip cord is pulled, the retaining patch is released at one side, and is drawn across to the opposite side of the pack, and due to the fact that there are no prongs or other safety means in cones 6 and 8, the movement of the patch releases said cones, thus permitting the end and side flaps to open, the pilot chute released and main chute launched in the usual manner. To further insure the quick release of the pilot and main parachute, parallel rumpling up elastic members 60 are arranged on the patch 8 and function to throw back the patch itself in addition to the elastic throw back member 29 of the side flap to which the released patch is secured.

Should the aviator desire to leave his ship and manually control the tripping of the time controlled releasing mechanism, he need only release the upper end of breaker cable 52, and leave the ship, and break the lever retaining cord when desired or pull the D-ring 14 in the conventional manner.

Having described the invention, what is claimed and desired to be covered by Letters Patent is:

1. The combination with a parachute pack carrier for a main and pilot parachute having a rip cord for releasing the parachutes, of means for operating said rip cord consisting of, a container, a parachute arranged at one end of the container and connected to said rip cord, a spring pressed piston adapted to force said parachute from the container and means for controlling the speed of movement of the piston.

2. The combination with a parachute pack carrier for a main and pilot parachute having a rip cord for releasing the parachutes, of means for operating said rip cord consisting of, a container, a parachute arranged at one end of the container and connected to said rip cord, a spring pressed piston adapted to force said parachute from the container, means for retaining said piston against the tension of the spring, and means for controlling the speed of movement of the piston.

3. The combination with a parachute pack carrier having a rip cord for releasing the parachute, of means for operating said rip cord consisting of, a container, a parachute arranged at one end of the container, a friction closure firmly fitting one end of the container, a spring pressed piston adapted to build up pressure beneath said closure and discharge said parachute, means for retaining the piston in its retracted position against the tension of the spring, means for releasing said retaining means, and means for controlling the speed of travel of the piston, as and for the purpose specified.

4. The combination with a parachute pack carrier having a rip cord for releasing the parachute, of means for operating said rip cord consisting of, a container, a parachute arranged at one end of the container, a friction closure firmly fitting one end of the container, a spring pressed piston adapted to build up pressure beneath said closure and discharge said parachute, an arm pivoted at one end and having a projection adapted to lock the piston in its retracted position, means for retaining said arm in piston locking position, means for releasing said retaining means, and means for controlling the speed of travel of the piston as and for the purpose specified.

5. The combination with a parachute pack carrier having a rip cord for releasing the parachute, of means for operating said rip cord consisting of, a container, a parachute arranged at one end of the container, a friction closure firmly fitting one end of the container, a spring pressed piston adapted to build up pressure beneath said closure and discharge said parachute, means for retaining the piston in its retracted position against the tension of the spring, consisting of an arm, pivoted at one end on the outer surface of the container and provided with a projection adapted to enter the container and retain the piston in retracted position, when said arm is swung toward the container, fragile means for retaining said lever in piston locking position, and means for controlling the speed of travel of the piston as and for the purpose specified.

6. The combination with a parachute pack carrier having a rip cord for releasing the parachute, of means for operating said rip cord consisting of, a container, a parachute arranged in said container, a friction closure firmly fitting one end of the container, a spring pressed piston adapted to build up pressure beneath said closure and discharge said parachute, a closure at the other end of the container, an adjustable valve adapted to control the admission of air in rear of the piston and the speed of travel of the piston and means for increasing said speed near the end of piston travel and forcibly discharging the parachute.

7. The combination with a parachute pack carrier having a rip cord for releasing the parachute, of means for operating said rip cord consisting of, a container, a parachute arranged in said container, a friction closure firmly fitting one end of the container, a spring pressed piston adapted to build up pressure beneath said closure and discharge said parachute, a closure at the other end of the container, an adjustable valve adapted to control the admission of air in rear of the piston and the speed of travel of the piston and a plurality of openings in the container, adapted to be uncovered by the piston during travel, admit a greater amount of air in rear of the piston, increase its speed of travel and forcibly discharge the parachute.

8. A device of the class described comprising, a cylinder, a frictionally mounted closure in one end of the cylinder, a parachute arranged in the cylinder beneath said closure, an air tight piston mounted in the cylinder adapted to build up pressure beneath said friction closure and discharge said parachute, a compression spring adapted to move the piston, a permanent closure in the other end of the cylinder, means for locking the piston against the tension of the spring, an adjustable air inlet valve adapted to admit air in rear of said piston to control the speed of travel of the piston and time of discharge of the parachute and a series of openings in the cylinder in a position to be uncovered by the piston during its travel and adapted to quickly release the piston and forcibly discharge the parachute.

WALTER C. ELLIS.